(12) United States Patent
Storz

(10) Patent No.: US 6,644,259 B2
(45) Date of Patent: Nov. 11, 2003

(54) INTAKE SYSTEM FOR AN INTERNAL-COMBUSTION ENGINE

(75) Inventor: Eberhard Storz, Kirchheim (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 10/143,855

(22) Filed: May 14, 2002

(65) Prior Publication Data

US 2002/0185106 A1 Dec. 12, 2002

(30) Foreign Application Priority Data

May 15, 2001 (DE) ......................................... 101 23 492

(51) Int. Cl.[7] ............................................... F02M 31/00
(52) U.S. Cl. ................................................. 123/184.21
(58) Field of Search ........................ 123/184.21, 184.23, 123/184.32, 184.39, 184.46

(56) References Cited

U.S. PATENT DOCUMENTS

| 5,275,135 A | * | 1/1994 | Clemens et al. | ....... 123/184.21 |
| 5,341,773 A | | 8/1994 | Schulte et al. | |
| 5,400,750 A | * | 3/1995 | Jaeger et al. | .......... 123/184.47 |
| 5,575,250 A | * | 11/1996 | Van Dyne, II | ......... 123/184.46 |
| 5,624,099 A | * | 4/1997 | Spies et al. | .................. 248/562 |
| 5,738,059 A | * | 4/1998 | Van Dyne, II | ......... 123/184.46 |
| 5,809,959 A | * | 9/1998 | Martinsson | ............ 123/184.21 |
| 5,878,715 A | * | 3/1999 | Hernandez et al. | ......... 123/337 |
| 5,988,131 A | * | 11/1999 | Hernandez et al. | .... 123/184.21 |

FOREIGN PATENT DOCUMENTS

| DE | 262 556 | 12/1988 |
| DE | 19803356 | 8/1999 |

\* cited by examiner

*Primary Examiner*—Willis R. Wolfe
*Assistant Examiner*—Douglas A Salser
(74) *Attorney, Agent, or Firm*—Crowell & Moring LLP

(57) ABSTRACT

An intake system for an internal-combustion engine has an air line (air pipe) whose end is detachably fastened on a flange of a component. The flange of the component has at least one recess which, in the mounted condition of the connection, engages with fastening elements are provided on the air pipe, so that the air pipe is axially secured on the flange of the component.

8 Claims, 7 Drawing Sheets

INTAKE SYSTEM FOR AN INTERNAL-COMBUSTION ENGINE

BACKGROUND AND SUMMARY OF THE INVENTION

This application claims the priority of German patent document 101 23 492.9, filed May 15, 2001, the disclosure of which is expressly incorporated by reference herein.

The invention relates to an intake system for an internal-combustion engine.

It is generally known from the prior art to fasten the air pipes or air hoses of the intake system of an internal-combustion engine to the corresponding components of an internal-combustion engine (such as the throttle body, for example) by way of hose band clips or similar devices, so that they cannot be lost. Due, however, to the increasingly compact construction in the engine compartment in modern vehicles, the accessibility for the mounting and demounting of connections of this type is often difficult.

It is therefore an object of the invention to provide a simple fastener, which can be released by means of a few manipulations, for the air guiding connections provided at the different engine components of the internal-combustion engine.

This and other objects and advantages are achieved by the fastening element according to the invention, which are provided at the air pipe. These fastening elements engage in a recess provided in the surface of a mounting flange of the engine component, and a simple form-locking connection of the two components is achieved which can be opened up rapidly.

Other objects, advantages and novel features of the present invention will become apparent from the following detailed description of the invention when considered in conjunction with the accompanying drawings.

DETAILED DESCRIPTION OF THE DRAWINGS

Figure 1:
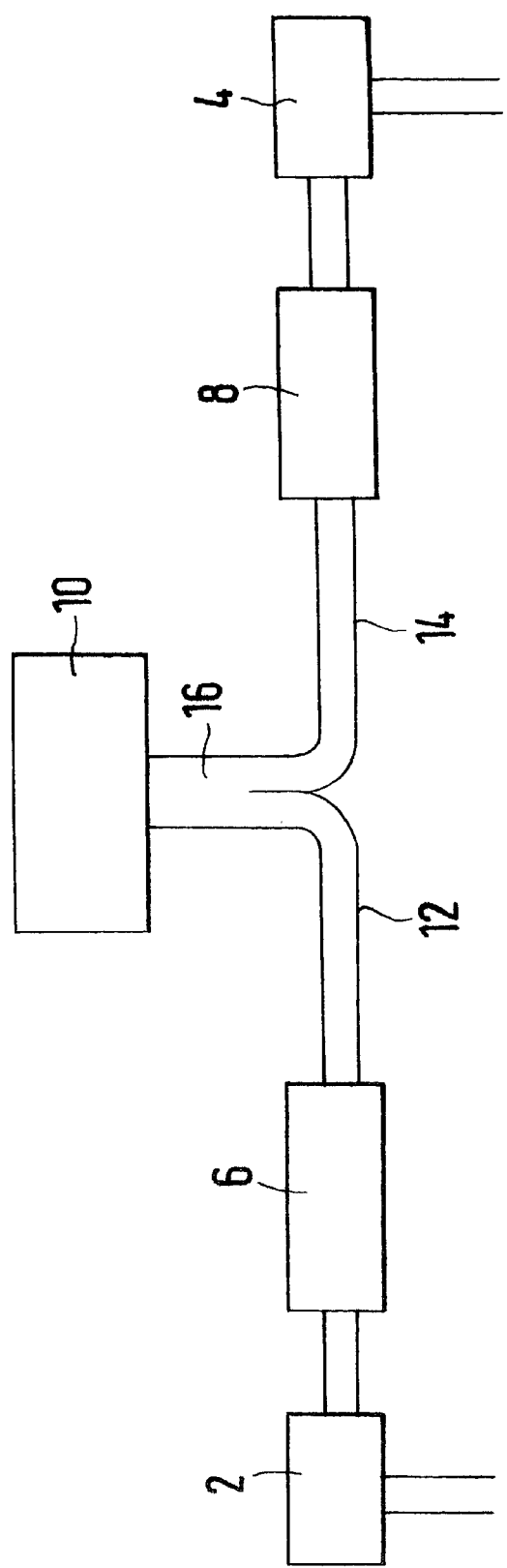
FIG. 1 is a schematic view of an intake system.

The intake system for a two-line internal-combustion engine with turbocharging, such as a V8 supercharged engine, is illustrated schematically in FIG. 1. Each line includes an air filter 2, 4, and a charge air cooler 6, 8 is connected to the throttle body 10, which in turn is connected to the suction system of the internal-combustion engine fastened on the engine side. The air pipes 12, 14 leading from the charge air coolers 6, 8 to the throttle body 10 are guided together in front of the throttle body 10 to form a common pipe section (hereinafter called a Y-pipe 16).

Figure 2:
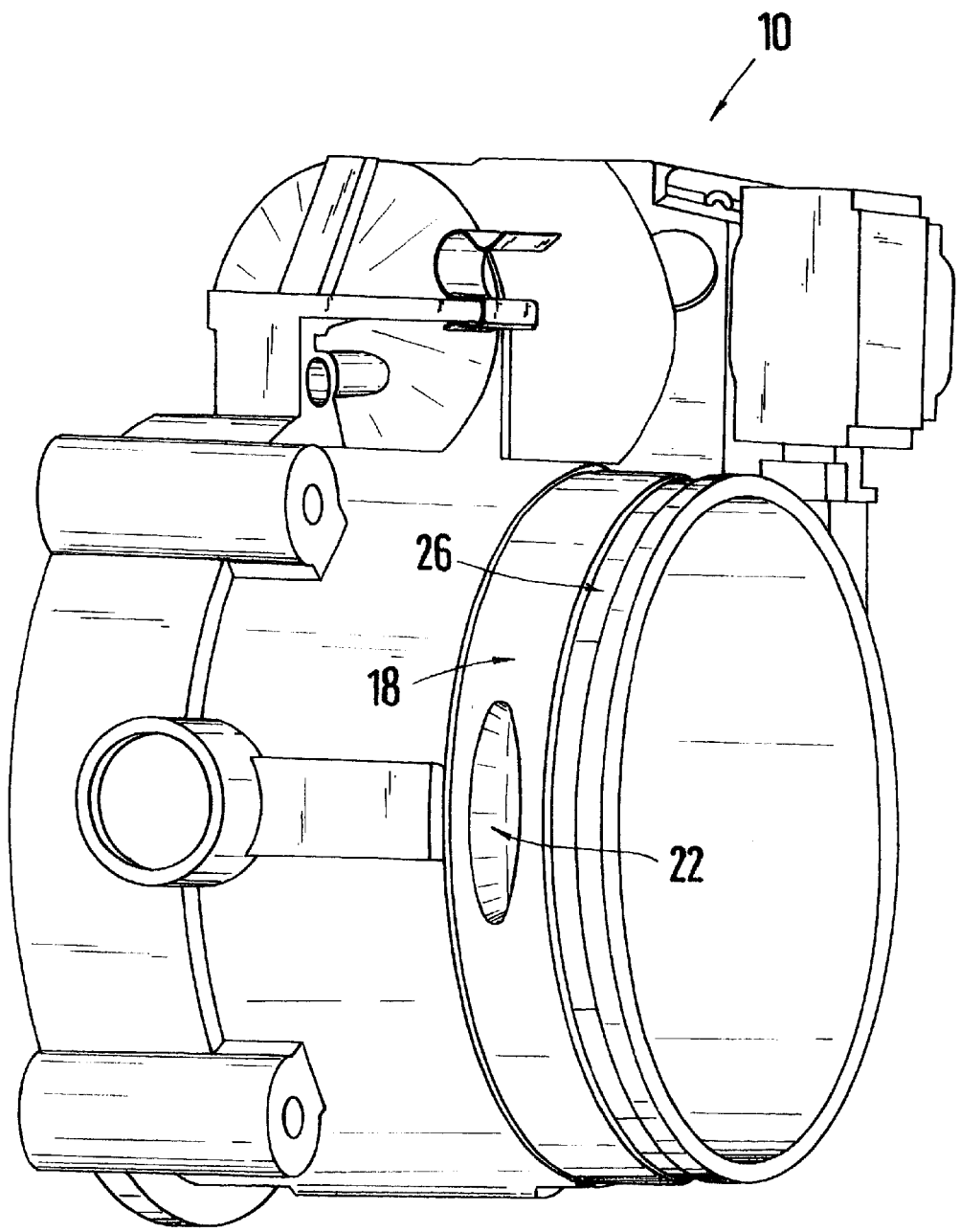
FIG. 2 is a first perspective view of the throttle body of an internal-combustion engine.
Figure 3:
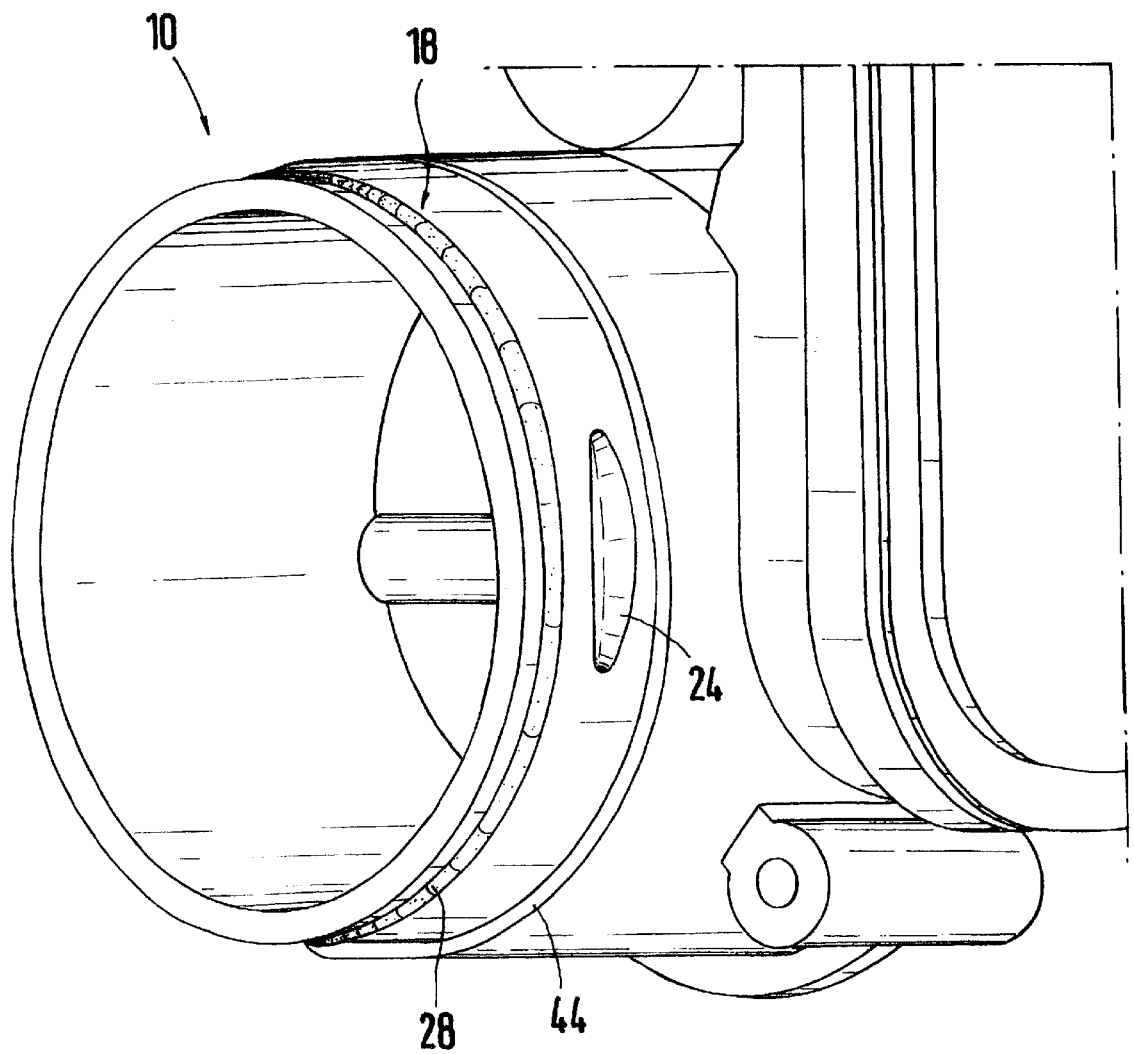
FIG. 3 is a second perspective view of the throttle body of an internal-combustion engine.

For fastening the Y-pipe 16 to the throttle body 10, the throttle body 10 is constructed with a flange 18, which is constructed as a ring collar, onto which the opening 20 (FIG. 4) of the Y-pipe 16 is fitted and fastened in the mounted condition. The flange 18 of the throttle body 10 has two recesses 22 and 24 (FIGS. 2 and 3) which, as explained below in detail, are used for fastening the Y-pipe 16 on the throttle body 10. A radially surrounding groove 26 is formed in the ring collar 18, into which groove 26 an O-ring 28 (FIG. 3) is inserted for sealing off the two components.

Figure 4:
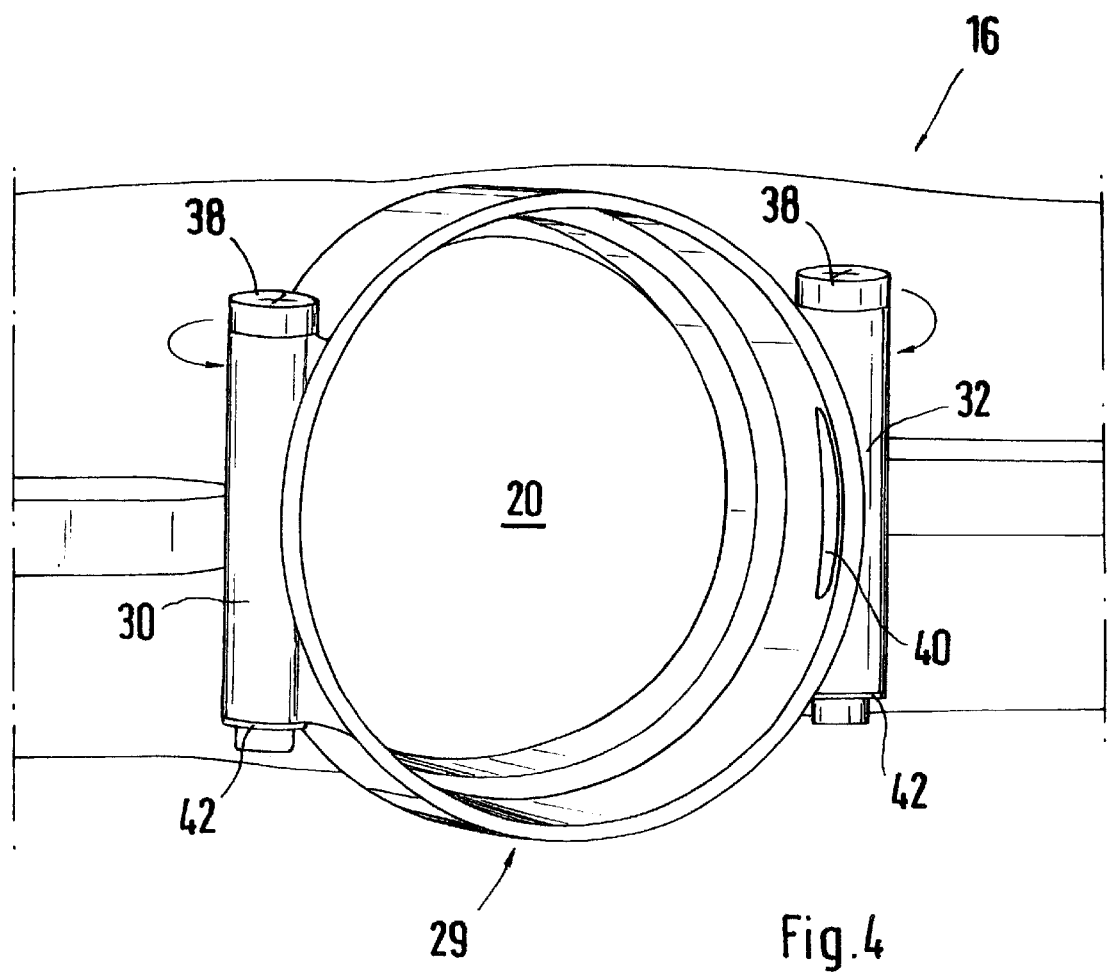
FIG. 4 is a view of the fastening connection piece of an air pipe.
Figure 5:
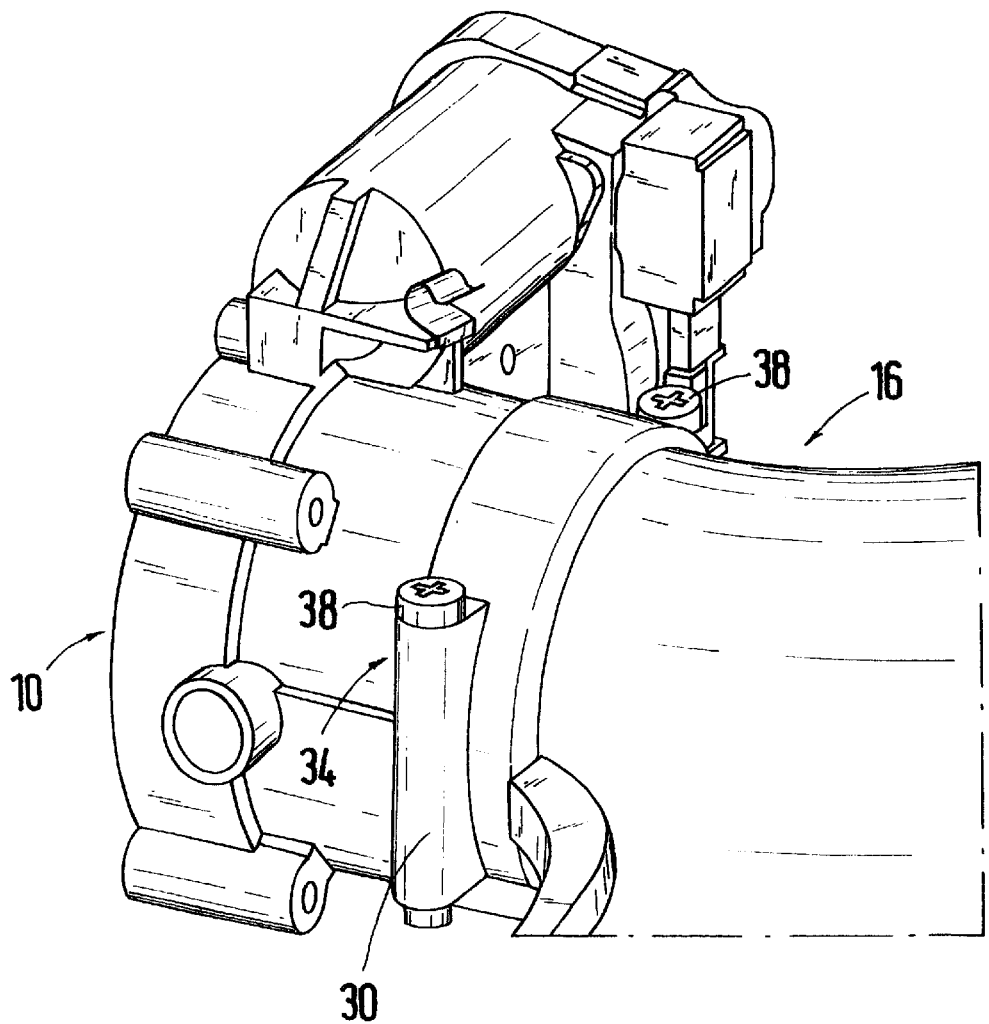
FIG. 5 is a view of an air pipe fastened to the throttle body.
Figure 6:
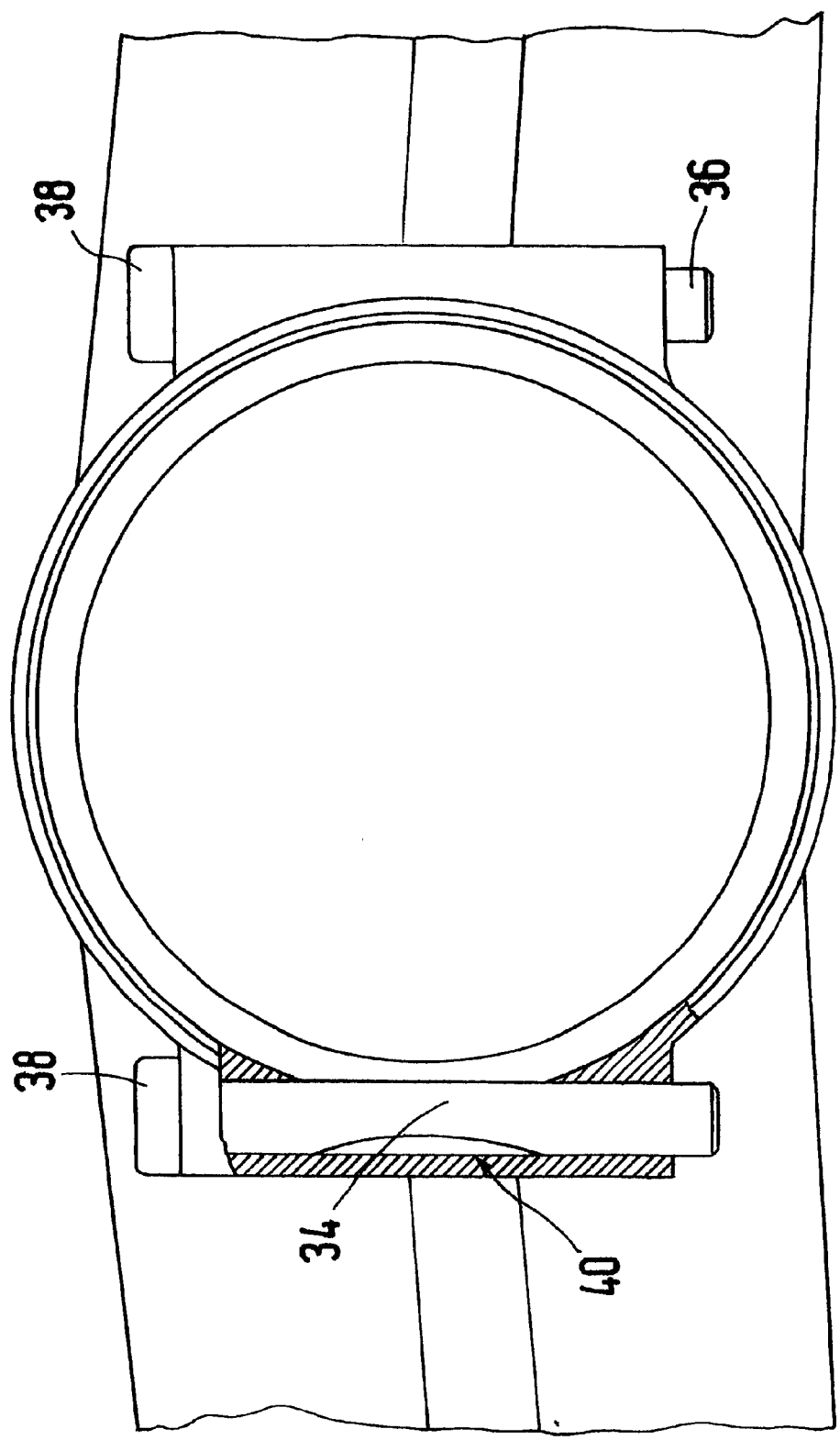
FIG. 6 is a sectional view of the fastening connection.

The pipe connection piece 29 of the Y-pipe 16 defining the opening 20 has two lateral molded-on holding sleeves 30 and 32 in which two locking bolts 34 and 36 (FIGS. 5, 6) are received. Each of the locking bolts 34, 36 has a head 38 which is provided with an internal toothing, and each is provided with a longitudinally extending notch 40 (FIGS. 4 and 6) whose contour (viewed from the side, as shown in FIG. 6) is cylindrical (circular) and corresponds essentially to the outside diameter of the flange 18 of the throttle body 10 or the diameter of the opening 20. As illustrated in FIG. 4, the two locking bolts 34, 36 are provided at their end with a snap ring 42, so that they are received in the holding pockets 30 and 32, which prevents them from being lost.

The mounting of the Y-pipe 16 on the throttle body 10 takes place in the following manner:

The two locking bolts 34 and 36 guided in the holding sleeves 30, 32 are positioned such that the two cylindrical notches 40 are aligned to coincide with the inner contour of the pipe connection piece 29 of the Y-pipe 16. In this position, the Y-pipe 16 can be pushed onto the flange 18 of the throttle body 10 until the pipe connection piece 29 comes to rest on a stop face 44 (FIG. 3) of the flange 18. (See FIG. 5.) As a result, the two locking bolts 34, 36 are caused to coincide in the axial direction with the two recesses 22 and 24 made at the flange 18 of the throttle body 10. Then the two locking bolts 34, 36 are rotated by 180° by means of a tool engaging in the internal toothing of the head 38 of the locking bolts 34, 36. As a result of this 180° rotation, a form-locking connection is established between the Y-pipe 16 and the throttle body 10 because—as illustrated particularly in FIG. 6—the outer contours of the locking bolts 34, 36 engage in a form-locking manner in the two recesses 22 and 24 of flange 18.

Figure 7:
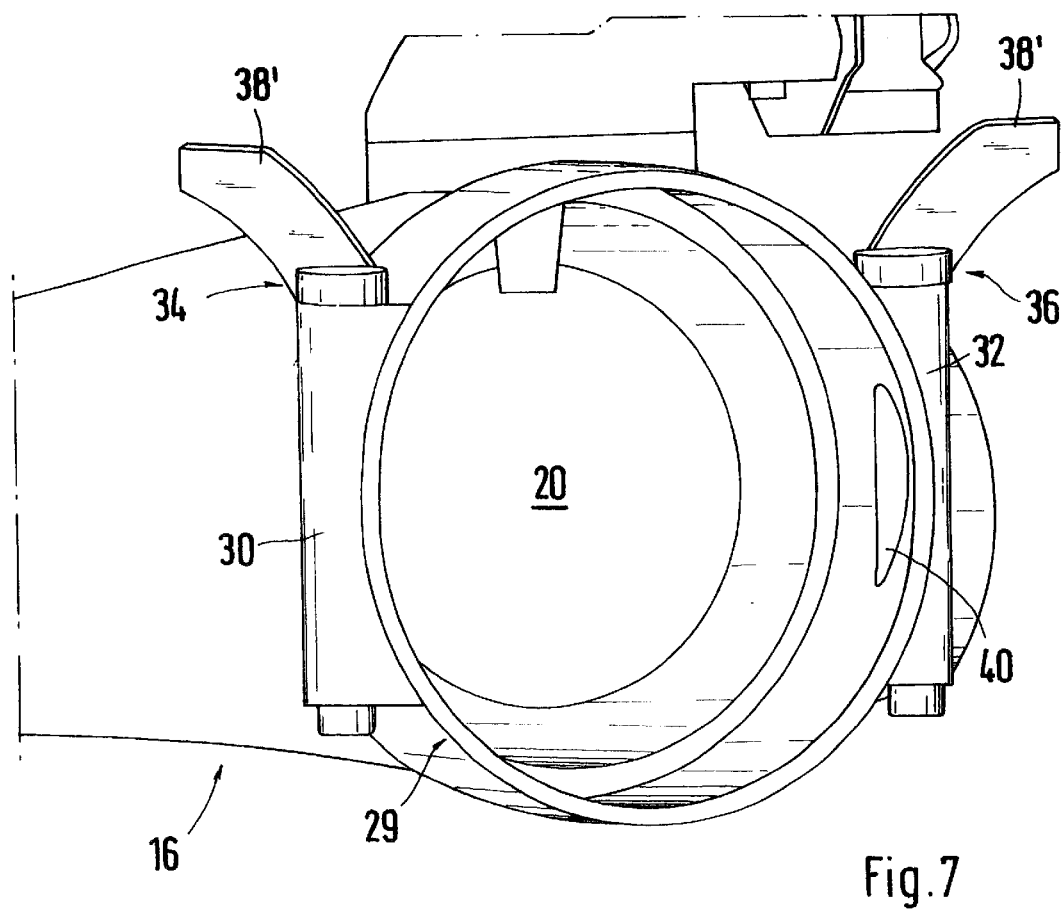
FIG. 7 is a view of the fastening connection piece of an air pipe according to a second embodiment.

In FIG. 7, the locking bolts 34, 36 are illustrated in a slightly modified embodiment which differs from the first embodiment in that the head 38' is provided with a grip by means of which the locking bolts 34, 36 can be manually changed into the locked or unlocked position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An intake system for an internal-combustion engine having an air line, of which an end is detachably fastened on a flange of a component of said engine, wherein:

the flange of the component has at least one recess; and
the air line includes fastening elements which, in a mounted state of the connection, engage with the at least one recess of the flange, whereby the air line, is axially secured on the flange of the component.

2. The intake system according to claim 1, wherein the fastening elements comprise locking bolts which are rotatably disposed in holding sleeves provided laterally on an air line connection piece of the air line.

3. The intake system according to claim 1, wherein for pushing the air line onto the flange of the component, the locking bolts are provided with a notch whose longitudinal contour corresponds essentially to an outer diameter of the flange of the component.

4. The intake system according to claim 3, wherein a head of the locking bolts has an internal toothing.

5. The intake system according to claim 1, wherein the flange of the component has a radially surrounding groove into which a sealing ring engages.

6. The intake system according to claim 1, wherein the component is a throttle body on whose flange a common end pipe of two air lines is fastened.

7. A coupling mechanism for detachably joining a fluid line to a component, said coupling mechanism comprising:

a mounting flange provided on said component;

a connection piece provided at an end of said fluid line, and having an interior cross sectional shape and size which corresponds to an exterior cross sectional shape and size of said mounting flange, whereby said connection piece can be nested with the mounting flange for coupling said fluid line with said component;

at least one elongate member which is axially rotatably mounted in a sleeve on said connection piece;

a notch extending along a side of said at least one elongate member, said notch having a longitudinal shape that corresponds to said exterior cross sectional shape of said mounting flange; and a notch provided on an exterior surface of said mounting flange, said notch having a transverse shape that corresponds to a transverse cross sectional shape of said elongate member;

wherein said sleeve is arranged on said connection piece such that, when said elongate member is axially rotated into a position that is within a preset range, at least a portion of a side thereof projects within said interior contour of said connection piece, and when said elongate member is axially rotated into a particular rotational position which is outside said preset range, said notch faces said interior of said connection piece, whereby a side of said elongate member does not project within said interior contour of said connection piece.

8. An apparatus comprising:

a component part; and a fluid line coupled to said component part by a coupling mechanism; wherein said coupling mechanism includes, a mounting flange provided on said component;

a connection piece provided at an end of said fluid line, and having an interior cross sectional shape and size which corresponds to an exterior cross sectional shape and size of said mounting flange, whereby said connection piece can be nested with the mounting flange for coupling said fluid line with said component;

at least one elongate member which is axially rotatably mounted in a sleeve on said connection piece;

a notch extending along a side of said at least one elongate member, said notch having a longitudinal shape that corresponds to said exterior cross sectional shape of said mounting flange; and a notch provided on an exterior surface of said mounting flange, said notch having a transverse shape that corresponds to a transverse cross sectional shape of said elongate member;

wherein said sleeve is arranged on said connection piece such that, when said elongate member is axially rotated into a position that is within a preset range, at least a portion of a side thereof projects within said interior contour of said connection piece, and when said elongate member is axially rotated into a particular rotational position which is outside said preset range, said notch faces said interior of said connection piece, whereby a side of said elongate member does not project within said interior contour of said connection piece.

\* \* \* \* \*